Oct. 11, 1932.  E. E. MILLER  1,882,156
EXPANSIBLE PACKING FOR PLUNGERS
Filed March 13, 1929
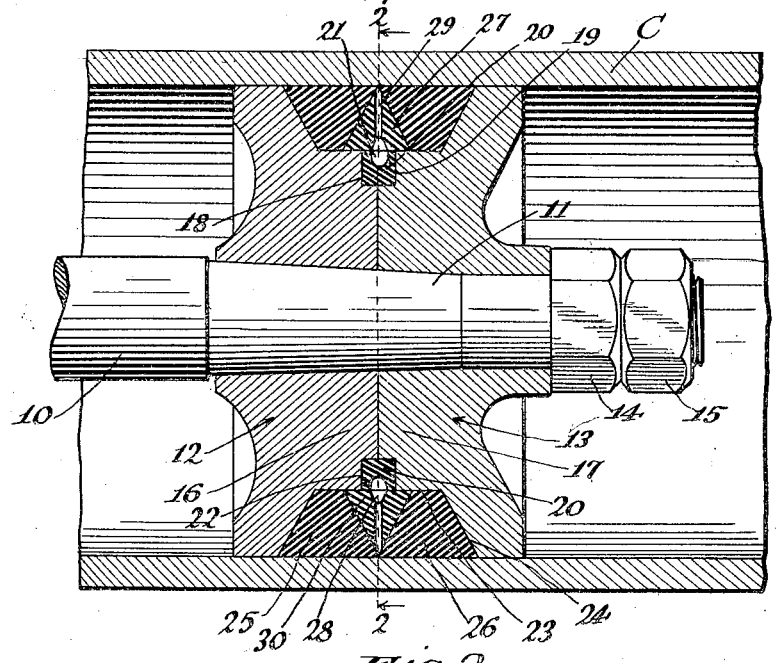
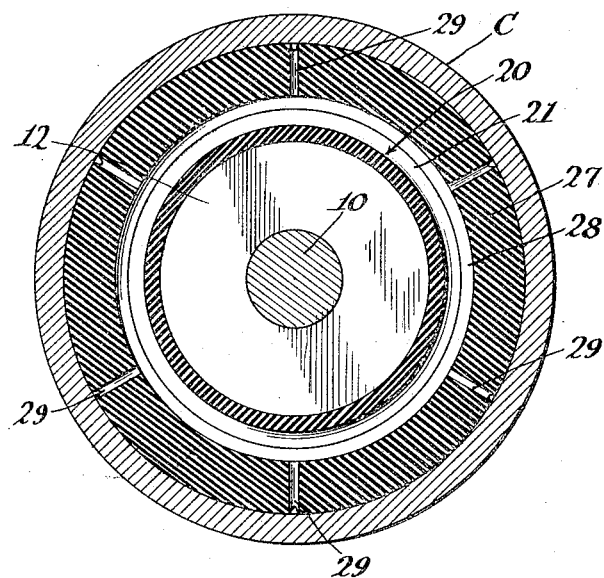
Inventor
Erwin E. Miller
by Hazard and Miller
Attorneys Patented Oct. 11, 1932

1,882,156

UNITED STATES PATENT OFFICE

ERWIN E. MILLER, OF FULLERTON, CALIFORNIA

EXPANSIBLE PACKING FOR PLUNGERS

Application filed March 13, 1929. Serial No. 346,621.

This invention relates to improvements in plungers for mud pumps and the like and to expansible packings therefor.

An object of the invention is to provide an improved mud pump plunger having an expansible packing of novel construction which can be easily and quickly assembled and disassembled.

Another object of the invention is to provide an expansible packing for mud pump plungers which is so constructed that the packing will be uniformly expanded and uniformly urged against the walls of the cylinder so as to effectively prevent leakage passed the piston in the plunger.

A further object of the invention is to provide an expansible packing for mud pump plungers which is formed of two packing elements or packing rings which are expanded by means of an expanding ring which is hydraulically operated.

Another object of the invention is to provide a mud pump plunger which has a piston formed by a pair of heads having abutting hubs and to provide an improved sealing element or hub packer which will prevent leakage between the hubs of the heads.

With the foregoing and other objects in view which will be made manifest in the following detailed description and specifically pointed out in the appended claims, reference is had to the accompanying drawing for an illustrative embodiment of the invention wherein:

Fig. 1 is a vertical section through the improved mud pump plunger.

Fig. 2 is a vertical section taken substantially upon the line 2—2 upon Fig. 1.

Referring to the accompanying drawing wherein similar reference characters designate similar parts throughout the improved plunger comprises a plunger rod 10 which is preferably provided with a tapered end 11 on which there are positioned heads 12 and 13, cooperating to form a piston on the plunger rod. The heads 12 and 13 are held on the plunger rod by nuts 14 and 15. They have projecting hubs 16 and 17 adapted to abut each other when in assembled relation. The edges of the abutting hubs are rebated as indicated at 18 and 19 so that the hubs cooperate in forming a peripheral groove about the abutment adapted to receive a sealing ring or hub packer 20. This ring is preferably formed of rubber or equivalent material and has a peripheral groove 21 formed thereon defining spaced flanges 22 which are adapted to be expanded when fluid is in the groove 21 against the hubs to prevent leakage around the sealing ring or hub packer 20 and between the hubs. Around the abutting hubs the two heads cooperate to form a groove 23, the sides of which, indicated at 24, diverge outwardly. The expansible packing comprises two packing rings 25 and 26 which are formed of rubber or equivalent material and the sides of these packing rings diverge outwardly so that the outer side of each packing ring fits against the diverging side on the adjacent head. The inner sides of the packing rings 25 and 26 form opposed faces which converge outwardly and between these opposed converging faces there is disposed an expanding ring 27 formed of rubber or equivalent material, the sides of which converge outwardly so as to fit between the opposed faces on the packing rings. On the interior of the expanding ring 27 there is formed an annular groove 28 adapted to be positioned opposite the groove 21 so that these two grooves form an annular chamber adapted to receive fluid which is supplied through radial ports 29 formed on the expanding ring.

The operation and advantages of the improved plunger are as follows: As the plunger reciprocates some fluid at first escapes past the piston until it reaches the radial ports 29. The fluid passes inwardly through the radial ports and collects in the annular chamber formed by the grooves 28 and 21. The pressure soon builds up in this annular chamber causing the flanges 22 on the sealing ring or hub packer 20 to expand against the hubs on the heads. At the same time the pressure is effective to expand the expanding ring 27 laterally and outwardly expanding the flanges 30 formed thereon which are defined by the groove 28. The outward expansion of the expanding ring which is wedge shaped in cross section tends to force the packing rings 25 and 26 outwardly against the walls of the cylinder C. The lateral expansion of the expanding ring tends to force the packing rings laterally against the diverging sides 24 of the groove 23, and in this manner the outer sides of the packing rings will be forced outwardly into engagement with the walls of the cylinder C as tightly as the inner sides of the packing rings which are forced outwardly by the diametrical expansion of the expanding ring 27. It will thus be appreciated that the improved expansible packing is so constructed that it will be uniformly expanded and exert a uniform pressure against the walls of the cylinder effectively preventing escape of fluid past the piston after the chamber formed by the grooves 28 and 21 is filled with fluid under pressure.

Various changes may be made in the details of construction without departing from the spirit or scope of the invention as defined by the appended claims.

I claim:

1. In a plunger for mud pumps and the like, a plunger rod, a pair of heads on the plunger rod having abutting hubs, there being a groove formed by the hubs at the abutment, a packing ring fitting in said groove having a groove formed in its periphery defining spaced flanges, and means for supplying the groove in the ring with fluid to expand the flanges against the hubs.

2. A plunger for mud pumps and the like comprising a plunger rod, means providing a piston on the plunger rod having a groove, packing means in the groove, hydraulically operated expanding means in the groove for expanding the packing means, and annular sealing means arranged inwardly of the expanding means.

3. A plunger for mud pumps and the like comprising a plunger rod, means providing a piston on the plunger rod having a groove, packing means in the groove, hydraulically operated expanding means in the groove for expanding the packing means, and annular sealing means arranged inwardly of the expanding means, there being provision for supplying fluid between the sealing means and expanding means.

4. A plunger for mud pumps and the like comprising a plunger rod, means providing a piston on the plunger rod having a groove, packing means in the groove, expanding means in the groove for expanding the packing means, and sealing means arranged inwardly of the expanding means, said sealing means and expanding means having opposed grooves cooperating to form an annular chamber, there being provision for supplying said chamber with fluid to expand the expanding means.

5. An expansible packing for mud pump plungers comprising a pair of endless annular packing rings, and an endless annular expanding ring arranged between the packing rings, said expanding ring having an interior annular groove.

6. An expansible packing for mud pump plungers comprising a pair of packing rings, and an expanding ring arranged between the packing rings, said packing rings having opposed faces which converge outwardly against which the expanding ring is adapted to bear on expanding, said expanding ring having passages therethrough adapted to convey fluid to the interior of the expanding ring.

7. An expanding ring for expansible packers comprising an endless annular ring having outwardly converging sides which converge to an edge, there being a groove formed on the interior surface of said ring, there being apertures establishing communication between said groove and said edge.

8. A piston having an annular groove formed therein, annular expansible packing rings disposed in the groove at the sides thereof, said packing rings presenting opposed outwardly converging sides, an expanding ring fitting between said sides, and means for entrapping fluid under pressure within the expanding ring to cause the expanding ring to urge the packing rings outwardly against the walls of the cylinder.

9. A piston having an annular groove formed therein, annular expansible packing rings disposed in the groove at the sides thereof, said packing rings presenting opposed outwardly converging sides, and an expanding ring fitting between said sides, said expanding ring having an interior annular groove formed therein, there being provision enabling fluid under pressure to collect in the groove to urge the expanding ring into expanded position.

10. A piston having an annular groove, expansible packing rings in the groove at the sides thereof, an expanding ring between the packing ring, and means enabling fluid from the exterior of the piston to collect on the interior of the expanding ring urging the expanding ring into expanded position.

11. A piston having an annular groove, expansible packing rings in the groove at the sides thereof, an expanding ring between the packing rings, there being a groove formed in the interior of the expanding ring, and means for conveying fluid under pressure from the exterior of the piston to the groove on the expanding ring.

12. A piston having an annular groove, expansible packing rings in the groove at the sides thereof, and an expanding ring between the packing rings, there being a groove formed on the interior of the expanding ring, there being radial ports formed in the expanding ring for conveying fluid under pressure to the groove in the expanding ring.

In testimony whereof I have signed my name to this specification.

ERWIN E. MILLER.